(12) United States Patent
Higurashi et al.

(10) Patent No.: US 6,288,857 B2
(45) Date of Patent: Sep. 11, 2001

(54) DIGITAL SIGNAL RECORDING APPARATUS, AND RELATED METHOD

(75) Inventors: Seiji Higurashi; Yoichi Zenno, both of Tokyo; Takeo Ohishi, Yokohama, all of (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/761,750

(22) Filed: Jan. 18, 2001

Related U.S. Application Data

(62) Division of application No. 09/186,282, filed on Nov. 5, 1998, now Pat. No. 6,198,585.

(30) Foreign Application Priority Data

Nov. 10, 1997 (JP) .................................................. 9-306974

(51) Int. Cl.[7] .................................................. G11B 5/09
(52) U.S. Cl. ................................................. 360/40; 360/48
(58) Field of Search .................................. 360/40, 46, 48, 360/51

(56) References Cited

U.S. PATENT DOCUMENTS

| 4,242,755 | * | 12/1980 | Gauzan | 375/114 |
| 5,512,349 | * | 4/1996 | Chiba et al. | 428/141 |
| 5,583,705 | * | 12/1996 | Ziperovich et al. | 360/45 |

FOREIGN PATENT DOCUMENTS 5-63694   3/1993 (JP) .
9515551   6/1995 (WO) .

OTHER PUBLICATIONS

R. D. Cideciyan et al.: "A PRML System for Digital Magnetic Recoding" IEEE Fournal on Selected Areas in Communications, vol. 10, No. 1, Jan. 1992, pp. 38–56, XP000457625, New York.

J. Fitzpatrick and J.K. Wolf: "Partial Response Class I Signaling Applied to High Density Magnetic Recoding" IEEE Global Telecommunications Conference, vol. 3, Dec. 1993, pp. 1950–1954, XP000436147, Houston.

* cited by examiner

*Primary Examiner*—Regina Y. Neal
(74) *Attorney, Agent, or Firm*—Connolly Bove Lodge & Hutz

(57) ABSTRACT

A digital signal recording apparatus includes an amble generator for generating an amble signal representing a bit-sequence amble pattern. The bit-sequence amble patter can be detected and reproduced by a partial-response detection system "PR(1, 0, −1)" as a detected amble pattern having a period of state inversions which is shorter than a period of state inversions in a detected amble pattern corresponding to a recorded amble pattern of alternation of "1" and "0". The amble signal generated by the amble generator and a first digital information signal are combined into a second digital information signal on a time sharing basis. The second digital information signal is recorded on a magnetic recording medium. For example, the bit-sequence amble pattern represented by the amble signal has repetition of six bits of "111000".

3 Claims, 3 Drawing Sheets

DIGITAL SIGNAL RECORDING APPARATUS, AND RELATED METHOD

RELATED APPLICATIONS

The present application is a divisional of U.S. patent application Ser. No. 09/186,282, filed Nov. 5, 1998, now U.S. Pat. No. 6,198,585.

BACKGROUND OF THE INVENTION

1. Field of the Invention

This invention generally relates to a digital signal recording apparatus, and particularly relates to an apparatus for recording a digital signal and an amble pattern signal on a magnetic recording medium. This invention also relates to a method of recording a digital signal on a recording medium.

2. Description of the Related Art

In some digital VTR's (video tape recorders), a digital information signal is recorded on a magnetic tape while an array of slant tracks is formed thereon. Each slant tracks is divided into areas assigned to main information pieces (for example, video information pieces, audio information pieces, subcode information pieces, and digital data pieces), and areas assigned to signals representing amble patterns such as a preamble pattern and a post-amble pattern. The main-information areas are separated by the amble-pattern areas.

The signals recorded on the amble-pattern areas are designed to decide the phase of a clock signal derived from reproduced data, to enable the absorption of errors in signal record positions during an editing process, and to compensate for an error in a track reproduction position due to a positional head attachment error.

In a typical digital VTR, a signal reproduced from a magnetic tape by magnetic heads is subjected to an equalization process by a waveform equalizer, and the equalization-resultant signal is converted into a binary digital signal (a bi-value digital signal). Then, a PLL (phase locked loop) circuit derives a clock signal from the binary digital signal. Accordingly, it is desirable that signals recorded on amble-pattern areas have such lengths as to stabilize the data derivation phase provided by the PLL circuit, and that the signals recorded on the amble-pattern areas provide such data inversion intervals as to easily enable the derivation of the clock signal.

In general, since a PLL circuit responds to data state inversions, an amble-pattern signal, which has many data state inversions during a given time interval, is effective in deriving a clock signal. For example, an amble-pattern signal which represents a bit sequence as "101010 . . . " is the most effective in providing a locked state of the PLL circuit, and in optimizing the phase of the derived clock signal.

It is known to use partial responses in magnetic recording and reproducing apparatuses. During the reproduction of a digital signal from a magnetic recording medium, the digital signal is differentiated by a magnetic head so that the reproduced signal outputted from the magnetic head basically has a differentiation-resultant waveform. Since a reproducing device including the magnetic head has a narrow passband width, the actual waveform of the reproduced signal agrees with a rounded or smoothed differentiation-resultant waveform.

According to a partial-response detection system "PR(1)" based on integral detection, the center level of the waveform of the output signal from the magnetic head is used to decide whether a reproduced signal state corresponds to a logic state of "1" or a logic state of "0". When a bit sequence represented by a recorded signal on a magnetic recording medium is denoted by "$a_k$", a detected or reproduced signal bit sequence "$b_k$" provided in the partial-response detection system "PR(1)" is given as "$b_k=a_k$". In this case, an amble pattern "101010 . . . " is detected and reproduced as a bit sequence "101010 . . . " which is the most convenient for a PLL circuit to derive a clock signal.

According to a partial-response detection system "PR(1, 0, −1)" better than the partial-response detection system "PR(1)", a recorded signal bit sequence "$a_k$" and a detected or reproduced signal bit sequence "$b_k$" are related as follows.

$$b_k = a_k \oplus a_{k-2}$$

where "$\oplus$" denotes modulo 2 addition. In this case, an amble pattern "101010 . . . " is detected and reproduced as a bit sequence "100000 . . . " which is inconvenient for a PLL circuit to derive a clock signal.

SUMMARY OF THE INVENTION

It is an object of this invention to provide a digital signal recording apparatus which generates and records an amble-pattern signal convenient for both a partial-response detection system "PR(1)" and a partial-response detection system "PR(1, 0, −1)" to derive a clock signal.

It is another object of this invention to provide a digital signal recording apparatus which includes a simple circuit for generating an amble-pattern signal.

It is sill another object of this invention to provide an improved method of recording a digital signal on a recording medium.

A first aspect of this invention provides a digital signal recording apparatus comprising an amble generator for generating an amble signal representing a bit-sequence amble pattern, wherein the bit-sequence amble pattern can be detected and reproduced by a partial-response detection system "PR(1, 0, −1)" as a detected amble pattern having a period of state inversions which is shorter than a period of state inversions in a detected amble pattern corresponding to a recorded amble pattern of alternation of "1" and "0"; means for combining the amble signal generated by the amble generator and a first digital information signal into a second digital information signal on a time sharing basis; and means for recording the second digital information signal on a magnetic recording medium.

A second aspect of this; invention is based on the first aspect thereof, and provides a digital signal recording apparatus wherein the bit-sequence amble pattern represented by the amble signal has repetition of six bits of "111000".

A third aspect of this invention is based on the first aspect thereof, and provides a digital signal recording apparatus wherein the bit-sequence amble pattern represented by the amble signal has repetition of eight bits of "11110000".

A fourth aspect of this invention provides a digital signal recording apparatus comprising means for generating a first digital signal; means for generating an amble signal representing a bit sequence having repetition of six bits of "111000"; means for combining the first digital signal and the amble signal into a second digital signal on a time sharing basis; and means for recording the second digital signal on a recording medium.

A fifth aspect of this invention provides a digital signal recording apparatus comprising means for generating a first digital signal; means for generating an amble signal representing a bit sequence having repetition of eight bits of "11110000"; means for combining the first digital signal and the amble signal into a second digital signal on a time sharing basis; and means for recording the second digital signal on a recording medium.

A sixth aspect of this invention provides a digital signal recording method comprising the steps of generating an amble signal representing a bit-sequence amble pattern, wherein the bit-sequence amble pattern can be detected and reproduced by a partial-response detection system "PR(1, 0, −1)" as a detected amble pattern having a period of state inversions which is shorter than a period of state inversions in a detected amble pattern corresponding to a recorded amble pattern of alternation of "1" and "0"; combining the generated amble signal and a first digital information signal into a second digital information signal on a time sharing basis; and recording the second digital information signal on a magnetic recording medium.

A seventh aspect of this invention is based on the sixth aspect thereof, and provides a digital signal recording method wherein the bit-sequence amble pattern represented by the amble signal has repetition of six bits of "111000".

An eighth aspect of this invention is based on the sixth aspect thereof, and provides a digital signal recording method wherein the bit-sequence amble pattern represented by the amble signal has repetition of eight bits of "1,110000".

DESCRIPTION OF THE PREFERRED EMBODIMENTS

First Embodiment

Figure 1:
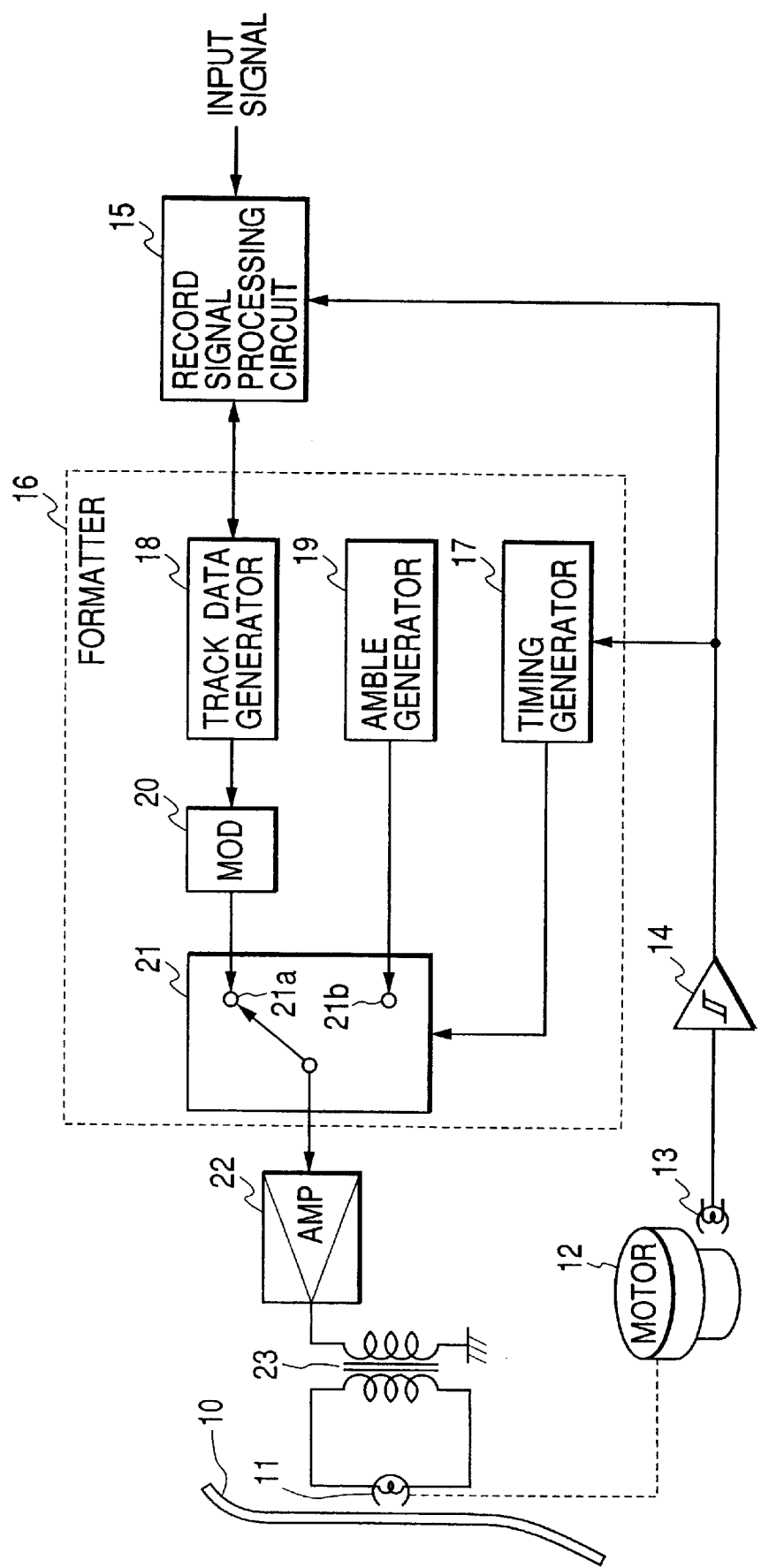
FIG. 1 is a block diagram of a digital signal recording apparatus according to a first embodiment of this invention.

With reference to FIG. 1, a magnetic tape 10 is scanned by a magnetic head set 11. The magnetic head set 11 has two magnetic heads mounted on the circumferential surface of a rotary drum (not shown) rotated by a drum motor 12. The two magnetic heads are diametrically opposed to each other. The magnetic tape 10 is wrapped on the circumferential surface of the rotary drum in a predetermined angular range along a part of helix. The two magnetic heads alternately record a digital signal on the magnetic tape 10 while forming slant recording tracks thereon.

A magnet or magnets mounted on a part of the drum motor 12 rotate in accordance with rotation of the output shaft of the drum motor 12. A drum pickup head 13 is located near the drum motor 12. Each time the magnet moves across a region in front of the drum pickup head 13, the drum pickup head 13 generates an electric pulse representing a detected rotational phase of the drum motor 12. The drum pickup head 13 outputs each detected rotational phase pulse to a waveform shaping circuit 14. The waveform shaping circuit 14 converts the output signal of the drum pickup head 13 into a head switching pulse signal having a symmetrically rectangular waveform. The head switching pulse signal changes between two different states in synchronism with the scanning of the magnetic tape 10 by each of the two magnetic heads. The waveform shaping circuit 14 feeds the head switching pulse signal to a record signal processing circuit 15 and a timing signal generator 17 in a formatter circuit 16.

The record signal processing circuit 15 converts an input information signal into digital data. The record signal processing circuit 15 generates subcode data, main code data, and error correction code data in response to the digital data. The record signal processing circuit 15 combines the subcode data, the main code data, and the error correction code data into record data on a time sharing basis. The record data has a sequence of data blocks referred to as sync blocks. The record signal processing circuit 15 feeds the record data to a track data generator 18 in the formatter circuit 16 datablock by data-block.

The track data generator 18 adds a sync signal and an address signal to the record data, and subjects the resultant data to a scrambling process. The track data generator 18 outputs the resultant digital signal to a modulator 20 in the formatter circuit 16. The modulator 20 subjects the output digital signal of the track data generator 18 to modulation of a given type which suits with magnetic recording and reproduction. The modulator 20 outputs the modulation-resultant signal to a fixed contact 21a of a switch 21 in the formatter circuit 16.

The switch 21 has another fixed contact 21b, and a movable contact. The movable contact of the switch 21 connects with either the fixed contact 21a or the fixed contact 21b. The movable contact of the switch 21 leads to a recording amplifier 22.

The formatter circuit 16 includes an amble generator 19 which produces an amble signal representing a predetermined amble (a predetermined preamble and a predetermined post-amble). The predetermined amble corresponds to a bit sequence pattern (an amble pattern) having recurrence or repetition of, for example, six bits "111000". The amble generator 19 outputs the amble signal to the fixed contact 21b of the switch 21.

The timing signal generator 17 produces a timing pulse signal in response to the head switching pulse signal fed from the waveform shaping circuit 14. The timing pulse signal is synchronous with the head switching pulse signal. The timing signal generator 17 feeds the timing pulse signal to a control terminal of the switch 21. The movable contact of the switch 21 selectively connects with one of the fixed contacts 21a and 21b thereof in response to the timing pulse signal. The timing pulse signal periodically changes between first and second levels. When the timing pulse signal assumes the first level, the movable contact of the switch 21 connects with the fixed contact 21a and disconnects from the fixed contact 21b. When the timing pulse signal assumes the second level, the movable contact of the switch 21 connects with the fixed contact 21b and disconnects from the fixed contact 21a. Accordingly, the switch 21 selects one of the output signal of the modulator 20 and the output signal of the amble generator 19 in response to the timing pulse signal. The switch 21 transmits the selected signal to the recording amplifier 22.

Specifically, the timing pulse signal produced by the timing signal generator 17 is designed so that the switch 21 will select the output signal of the amble generator 19 during every time interval for which the amble signal should occur in a signal to be recorded, and that the switch 21 will select the output signal of the modulator 20 during other time intervals.

The recording amplifier 22 enlarges the signal transmitted from the switch 21. The recording amplifier 22 outputs the resultant signal to a rotary transformer set 23 as a digital signal to be recorded. The digital signal is transmitted via the rotary transformer set 23 to the magnetic head set 11. The two magnetic heads in the set 11 alternately record the digital signal on the magnetic tap 10 while forming slant recording tracks thereon. The slant recording tracks are referred to as the digital signal recording tracks.

Figure 2:
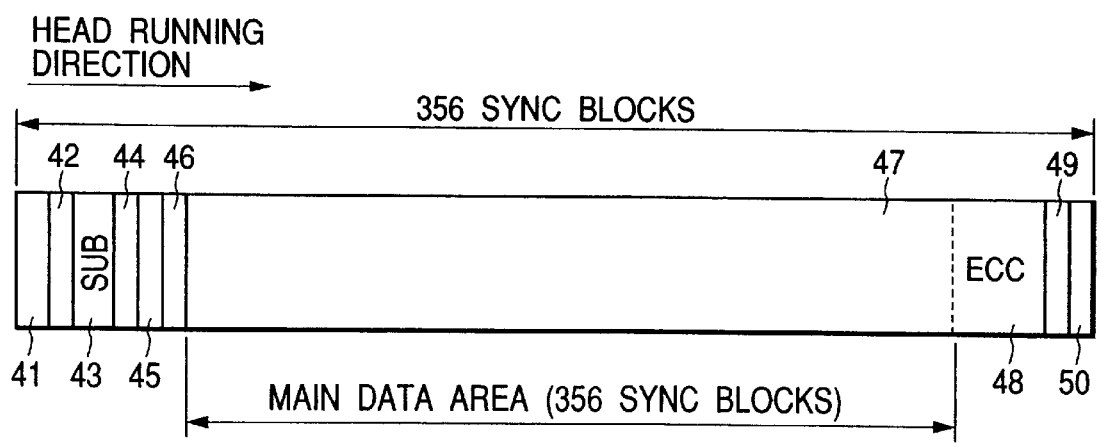
FIG. 2 is a diagram of a format of one digital signal recording track on a magnetic tape in FIG. 1.

FIG. 2 shows an example of a format of one digital signal recording track on the magnetic tape 10. With reference to FIG. 2, one digital signal recording track has a sequence of a margin area 41, a preamble area 42, a subcode area 43, a post-amble area 44, an IBG area 45, a preamble area 46, a main data area 47, an error correction code (ECC) area 48, a post-amble area 49, and a margin area 50. Each of the digital signal recording tracks corresponds to 356 sync blocks. The main data area 47 has 306 sync blocks equal to an integral multiple of 6 sync blocks. The 306 sync blocks in the main data area 47 store main data (normal data or special data). The error correction code area 48 has 30 sync blocks storing an outer error correction code signal (a C2 code signal or an outer code signal). The preamble area 42, the subcode area 43, and the post-amble area 44 store preamble data, subcode data, and post-amble data respectively. The IBG area 45 stores IBG data providing an inter-block gap between a subcode data zone and a main data zone. The preamble area 46 and the post-amble area 49 store preamble data and post-amble data respectively.

Figure 3:
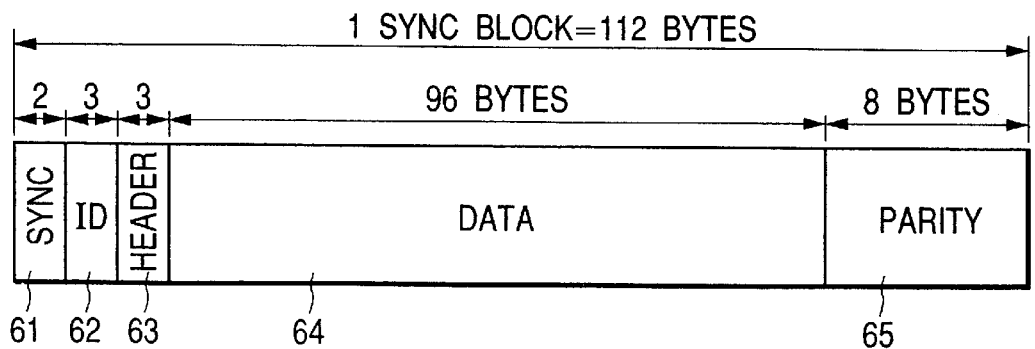
FIG. 3 is a diagram of a format of one sync block related to a digital signal recorded on the magnetic tape in FIG. 1.

FIG. 3 shows an example of a format of one sync block. With reference to FIG. 3, one sync block corresponds to 112 bytes in capacity (size), and has a sequence of sub areas 61, 62, 63, 64, and 65. The first sub area 61 has 2 bytes, and stores a sync signal for enabling the reproduction of the present sync block. The second sub area 62 has 3 bytes, and stores address information. The address information is also referred to as the identification (ID) information. The third sub area 63 has 3 bytes, and stores header information including various information pieces. The fourth sub area 64 has 96 bytes, and stores effective data. The fourth sub area 64 is referred to as the data storing area or the data storing region. The fifth sub area 65 has 8 bytes, and stores a signal of parities for correcting an error or errors in the information represented by the other sub areas 61–64.

With reference back to FIG. 2, the preamble area 42 has one sync block. The post-amble area 44 has two sync blocks. The preamble area 46 has one sync block. The post-amble area 49 has two sync blocks. The preamble data in the preamble area 42, the post-amble data in the post-amble area 44, the preamble data in the preamble area 46, and the post-amble data in the post-amble area 49 are formed by the output signal of the amble generator 19, that is, the amble signal produced by the amble generator 19. Thus, the amble signal recorded on every digital signal recording track has six sync blocks (672 bytes). As previously indicated, the amble signal corresponds to a bit sequence pattern (an amble pattern) having recurrence or repetition of, for example, six bits "111000".

According to a partial-response detection system "PR(1)", during the reproduction of the digital signal from the magnetic tape 10, the amble signal having recurrence of six bits "111000" is reproduced as a detected signal having recurrence of six bits "111000". In this case, a data state inversion occurs in the detected amble signal for every 3-bit time interval so that a PLL circuit for deriving a clock signal can easily fall into a locked state, and that the phase of the clock signal derived by the PLL circuit can be properly determined.

According to a partial-response detection system "PR(1, 0, −1)", during the reproduction of the digital signal from the magnetic tape 10, the amble signal having recurrence of six bits "111000" is reproduced as a detected signal having recurrence of three bits "110". In this case, a data state inversion occurs in the detected amble signal for every short time interval so that a PLL circuit for deriving a clock signal can easily fall into a locked state, and that the phase of the clock signal derived by the PLL circuit can be properly determined.

Figure 4:
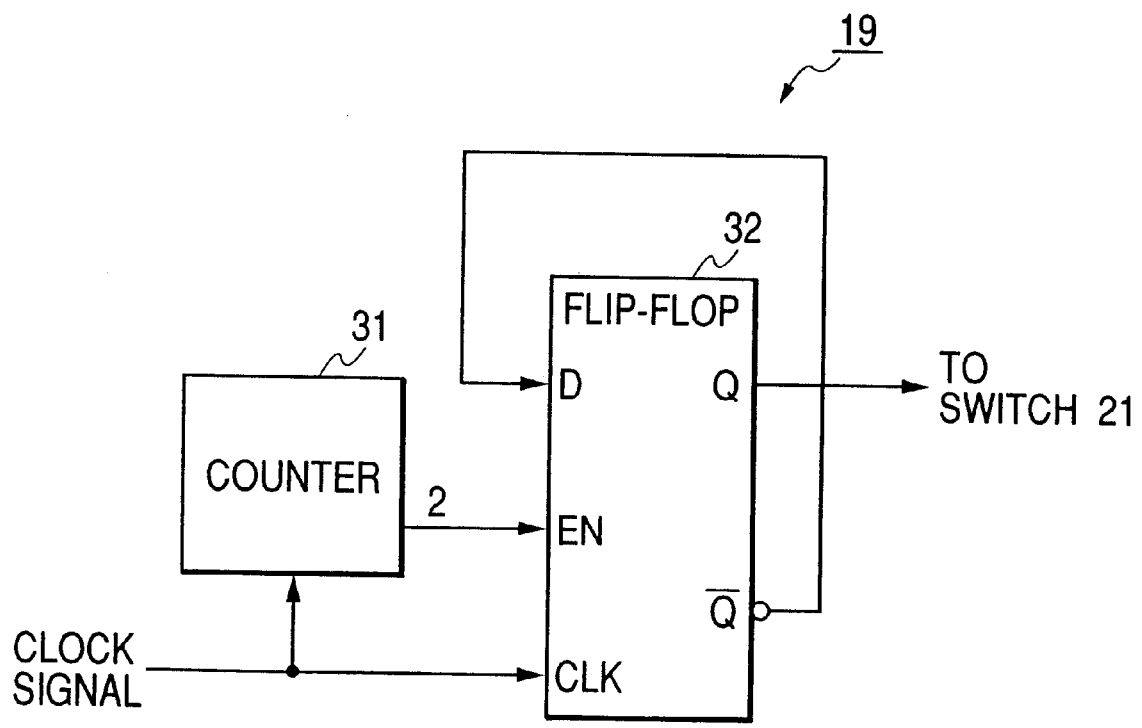
FIG. 4 is a block diagram of an amble generator in FIG. 1.

As shown in FIG. 4, the amble generator 19 includes a counter 31 and a D-type flip-flop 32. A clock signal generated by a suitable device (not shown) is applied to the input terminal of the counter 31. The clock signal is also applied to the clock input terminal of the D-type flip-flop 32. The clock signal has a predetermined period corresponding to one bit. The output terminal of the counter 31 is connected to the enabling terminal of the D-type flip-flop 32. The $\overline{Q}$ output terminal of the D-type flip-flop 32 is connected to the data input terminal thereof. The Q output terminal of the D-type flip-flop 32 is connected to the fixed contact 21b of the switch 21 (see FIGS. 1).

The counter 31 generates a signal representing a count value which is updated in response to every pulse in the clock signal. The count value periodically and cyclically changes among three different values as "0, 1, 2, 0, 1, 2, 0, . . . ". Only when the count value is equal to "2", the counter 31 outputs an enabling signal to the D-type flip-flop 32. During the reception of the enabling signal, the D-type flip-flop 32 samples and holds the signal at its $\overline{Q}$ output terminal in response to a pulse in the clock signal. During the absence of the enabling signal, the D-type flip-flop 32 continues to hold the last sampled signal independent of the state of the clock signal.

When the count value is equal to "0" or "1", the output signal of the D-type flip-flop 32 which appears at the Q output terminal thereof remains in the last logic state. When the count value changes to "2", the output signal of the D-type flip-flop 32 inverts from the last logic state to the other logic state. Accordingly, the output signal of the D-type flip-flop 32 has recurrence or repetition of six bits "111000". The output signal of the D-type flip-flop 32 is applied to the fixed contact 21b of the switch 21 (see FIG. 1) as the amble signal.

The amble pattern represented by the amble signal may differ from recurrence of six bits "111000" provided that the period of the occurrence of data state inversions in the detected amble signal in a partial-response detection system "PR(1 0, −1)" is shorter than that occurring for an amble pattern of "101010 . . . ", that is, an amble pattern of alternation of "1" and "0".

It should be noted that the magnetic tape 10 may be replaced by a magnetic recording medium of another type such as a magnetic disc.

Second Embodiment

A second embodiment of this invention is similar to the first embodiment thereof except for design changes indicated below.

According to the second embodiment, the counter 31 in the amble generator 19 is modified so that the count value will periodically and cyclically change among four different values as "0, 1, 2, 3, 0, 1, 2, 3, 0, . . . ". Only when the count value is equal to "3", the counter 31 outputs an enabling signal to the D-type flip-flop 32. During the reception of the enabling signal, the D-type flip-flop 32 samples and holds the signal at its $\overline{Q}$ output terminal in response to a pulse in the clock signal. During the absence of the enabling signal, the D-type flip-flop 32 continues to hold the last sampled signal independent of the state of the clock signal.

When the count value is equal to "0", "1", or "2", the output signal of the D-type flip-flop 32 which appears at the Q output terminal thereof remains in the last logic state. When the count value changes to "3", the output signal of the D-type flip-flop 32 inverts from the last logic state to the other logic state. Accordingly, the output signal of the D-type flip-flop 32 has recurrence or repetition of eight bits "11110000". The output signal of the D-type flip-flop 32 is applied to the fixed contact 21*b* of the switch 21 (see FIG. 1) as the amble signal.

According to a partial-response detection system "PR(1)", during the reproduction of the digital signal from the magnetic tape 10, the amble signal having recurrence of eight bits "11110000" is reproduced as a detected signal having recurrence of eight bits "11110000". In this case, a data state inversion occurs in the detected amble signal for every 4-bit time interval so that a PLL circuit for deriving a clock signal can easily fall into a locked state, and that the phase of the clock signal derived by the PLL circuit can be properly determined.

According to a partial-response detection system "PR(1, 0, −1)", during the reproduction of the digital signal from the magnetic tape 10, the amble signal having recurrence of eight bits "11110000" is reproduced as a detected signal having recurrence of four bits "1100". In this case, a data state inversion occurs in the detected amble signal for every short time interval so that a PLL circuit for deriving a clock signal can easily fall into a locked state, and that the phase of the clock signal derived by the PLL circuit can be properly determined.

What is claimed is:

1. A recording medium having an amble area and a main data area, the amble area storing an amble signal representing a repetitive amble pattern, and the main data area storing main data, wherein the amble pattern can be detected and reproduced by a partial-response detection system "PR(1)" and also a partial-response detection system "PR(1, 0, −1)", and wherein the reproduced amble pattern which occurs during reproduction by the partial-response detection system "PR(1, 0, −1)" has a period of signal state inversions shorter than a period of signal state inversions in the reproduced amble pattern occurring during reproduction by the partial-response detection system "PR(1)".

2. A recording medium as recited in claim 1, wherein the repetitive amble pattern represented by the amble signal stored in the amble area includes a repetition of six bits of "111000".

3. A recording medium as recited in claim 1, wherein the repetitive amble pattern represented by the amble signal stored in the amble area includes a repetition of eight bits of "11110000".

* * * * *